United States Patent [19]

Chszaniecki

[11] Patent Number: 5,108,711
[45] Date of Patent: Apr. 28, 1992

[54] MULTI-SHAFT THIN-LAYER REACTOR

[75] Inventor: Siegfried Chszaniecki, Hanover, Fed. Rep. of Germany

[73] Assignee: Hermann Berstorff Maschinenbau GmbH, Hanover, Fed. Rep. of Germany

[21] Appl. No.: 646,807

[22] Filed: Jan. 23, 1991

[30] Foreign Application Priority Data

Jan. 24, 1990 [DE] Fed. Rep. of Germany ....... 4001986

[51] Int. Cl.$^5$ ................................................ B01F 7/26
[52] U.S. Cl. ....................................... 422/135; 159/2.2;
264/211.23; 366/75; 366/83; 422/131; 422/224;
425/203; 425/204
[58] Field of Search ...................... 264/211.21, 211.23,
264/102, 349; 425/203, 204; 366/75, 76, 77, 79,
80, 83, 84, 85, 86, 89, 134; 422/131, 134, 135,
224; 159/2.2, 6.1, 6.2, 49

[56] References Cited

U.S. PATENT DOCUMENTS

| | | | |
|---|---|---|---|
| 2,754,542 | 7/1956 | Henning et al. | 366/85 |
| 2,763,046 | 9/1956 | Ludowici | 264/102 |
| 2,774,105 | 12/1956 | Bernhardt | 264/102 |
| 2,817,876 | 12/1957 | Gandelli et al. | 264/102 |
| 3,110,060 | 11/1963 | Rengert | 425/203 |
| 3,310,837 | 3/1967 | Wittrock | 366/85 |
| 3,795,386 | 3/1974 | Carter et al. | 159/2.2 |
| 3,797,550 | 3/1974 | Latinen | 425/203 |
| 3,825,236 | 7/1974 | Hussmann et al. | 366/76 |
| 3,929,322 | 12/1975 | Hanslik | 366/85 |
| 4,176,967 | 12/1979 | Brinkmann et al. | 386/83 |
| 4,192,617 | 3/1980 | Spielhoff | 366/83 |
| 4,289,409 | 9/1981 | Brand | 366/83 |
| 4,303,344 | 12/1981 | Müller | 366/76 |
| 4,591,487 | 5/1986 | Fritsch | 366/83 |
| 4,686,088 | 8/1987 | Fritsch | 159/2.2 |
| 4,773,654 | 9/1988 | Fritsch | 366/84 |
| 4,889,430 | 12/1989 | Mueller | 425/204 |

FOREIGN PATENT DOCUMENTS

| | | |
|---|---|---|
| 0208139 | 6/1986 | European Pat. Off. . |
| 439900 | 1/1927 | Fed. Rep. of Germany . |
| 2905717 | 8/1980 | Fed. Rep. of Germany . |
| 3513536 | 1/1987 | Fed. Rep. of Germany . |
| 3030541 | 9/1988 | Fed. Rep. of Germany . |

Primary Examiner—Jay H. Woo
Assistant Examiner—William Matney, Jr.
Attorney, Agent, or Firm—Foley & Lardner

[57] ABSTRACT

A multi-shaft thin-layer reactor for treating fluid materials in which gaseous material is present during such treatment. The treatment involves the addition of gas to the fluid material or the removal of gas therefrom. The reactor includes a housing in which a plurality of axis-parallel conveying shafts are disposed. The housing is cylindrical and the shafts are disposed around the inner periphery thereof in such a manner that each shaft meshes with the two shafts adjacent thereto. The meshing shafts jointly define the outer periphery of a treatment chamber within the housing. At least one sun-and-planet roller extrusion assembly rotates the shafts and is adjacent at least one end of the shafts in a form-locking manner. The conveying shafts also scrape against the internal wall of the housing so that thin layers of the fluid materials fed into the reactor are formed and these thin layers become disposed on the conveyor shafts. Since the treatment chamber is connected to a vacuum source or to a source of gas, the material is readily gassed or degassed as desired. The material itself seals the treatment chamber.

12 Claims, 4 Drawing Sheets

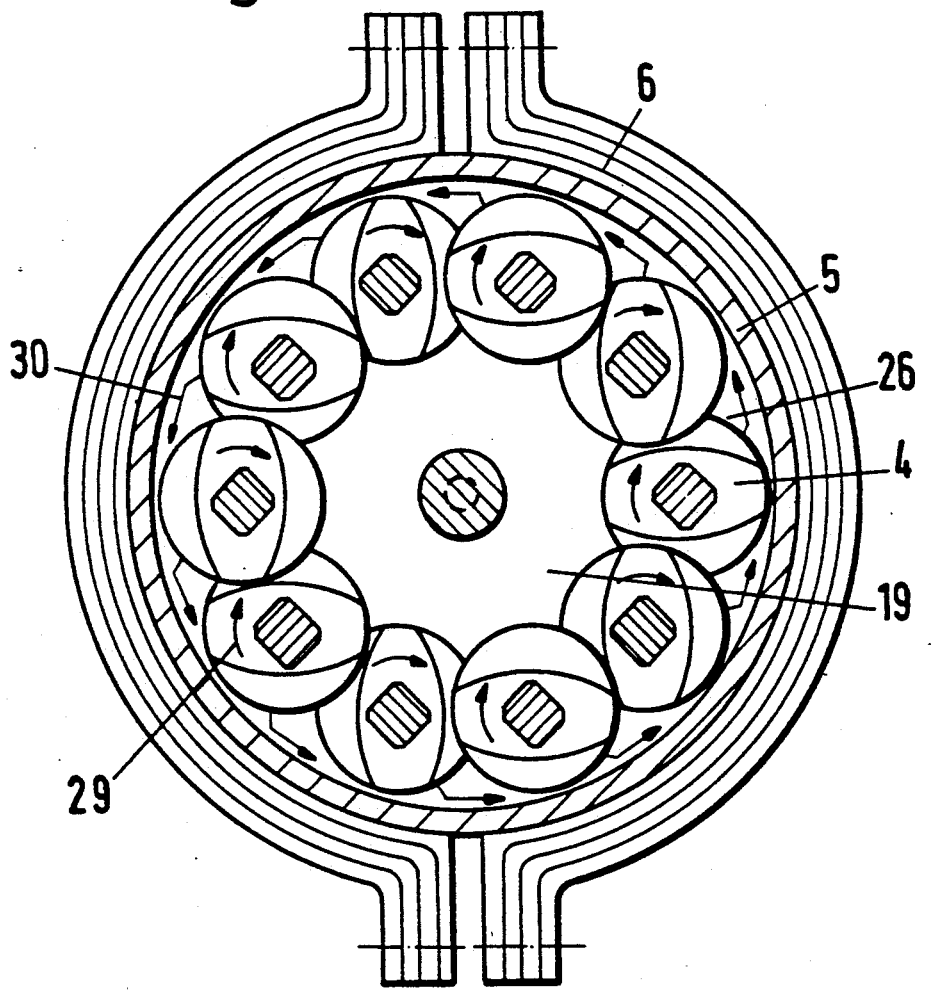

MULTI-SHAFT THIN-LAYER REACTOR

The present invention relates to a multishaft thin-layer reactor. More particularly, the present invention relates to a multi-shaft thin-layer reactor for the continuous production of polymeric or other materials which are to be gassed or degassed.

BACKGROUND OF THE INVENTION AND PRIOR ART DISCUSSION

A reactor of this general type is disclosed in European Patent Specification No. 0 208 139A1. In such document, there is described a reactor comprising a housing within which is defined a chamber. The chamber is connected to a source of reduced or excess pressure depending upon whether the material is to be degassed or gassed. Within the chamber, a plurality of rotatably drivable, axis-parallel, intermeshing conveying shafts are mounted. The shafts are disposed around the interior periphery of the housing and each shaft meshes with the two shafts adjacent thereto. The shafts are all rotated in the same direction so that thin layers of the material to be treated are formed on the portions of the shafts which face into the chamber. Effectively, therefore the degassing or gassing chamber is formed radially inwardly of the conveying shafts. The shafts are not free to move axially but the longitudinal ends thereof are guided upwardly into a transmission unit so that they can be rotated. Such thin-layer reactor carries out an operation for degassing or gassing the material. Primarily, this prior specification is concerned with providing a system for sealing the conveying shafts. To effect gassing or degassing, the chamber, which is sealed at its upper and lower ends, is subjected either to an excess pressure or to reduced pressure, which latter may be a vacuum.

The particular advantage of such an arrangement is that very thin layers of molten material are formed on the circumferential portions of the conveying shafts which face into the central degassing chamber. The chamber will, henceforth, be referred to as a degassing chamber although it will be readily apparent from the foregoing that it can equally act as a gassing chamber. The thickness of the layers of molten mass is dependent upon the spacing between the individual, intermeshing conveying shafts. The material to be treated which, in this instance, is in the form of a molten mass and is to be degassed, is fed into the reactor such that it passes onto the external surface of the intermeshing conveying shafts. Due to their rotation and to their surface geometry, the conveying shafts carry the molten mass into the central degassing chamber. In such chamber, the volatile components entrapped in the thin layers of molten mass are diffused onto the surface of the molten mass as a result of the reduced pressure being formed, and they are removed by suction.

Due to the formation of these thin layers of molten mass, thin-layer reactors are particularly suitable for removing volatile components with the exception of a few parts per million thereof, from a molten mass or from a fluid. In particular, however, the parallel disposition of the intermeshing shafts ensures that all of the molten mass is spread to form thin layers and, in consequence, the volatile components can be removed therefrom in a highly satisfactory manner.

However, in such thin-layer reactors, it has proved particularly difficult to seal the individual, intermeshing, conveyor shafts from the drive mechanism. This is essential if the pressure in the central degassing chamber is to remain as low as $10^{-4}$ bar.

Complex sealing systems are required for this purpose and one such system is described in detail in the above-numbered European Patent Specification. Moreover, a complex transmission unit is required to rotate the intermeshing conveying shafts accurately and in the same direction. Such a transmission unit is disclosed in German Patent Specification No. 30 30 541.

Furthermore, in a thin-layer reactor of the above-described type, it is necessary to rotate the housing surrounding the conveying shafts in an oscillatory manner. This is to prevent layers of the material being processed from fritting or caking together on the internal wall of the housing. A system designed to achieve such oscillation is disclosed in German Patent Specification No. 35 13 536.

OBJECTS OF THE INVENTION

The present invention seeks to provide a thin-layer reactor of the above-described general type but in which complex sealing systems for the individual conveying shafts are no longer required and the means for driving the individual conveying shafts are substantially simplified. The present invention also seeks to provide a reactor in which it is unnecessary to rotate the housing in order to prevent material from caking on the internal wall of the housing.

SUMMARY OF THE PRESENT INVENTION

In accordance with the present invention, there is provided a multi-shaft thin-layer reactor for the treatment of fluid materials wherein gaseous components are present during said treatment, said reactor comprising housing means; said housing including a longitudinal axis; a wall surface spaced from said longitudinal axis to form an internal wall of said housing thereby defining a hollow interior within said housing and first and second opposed axial end regions; feed means for introducing said fluid material into said hollow interior of said housing; a plurality of conveying shaft means disposed adjacent one another within said hollow interior adjacent said internal wall; each said conveying shaft means including a longitudinal axis, said axes of said shafts all extending parallel with one another and each said shaft meshing with both said conveying shaft means adjacent thereto, all said conveying shaft means jointly defining the outer periphery of a chamber within said hollow interior of said housing; drive means operatively connected to each said conveying shaft means for rotation of each said shaft about its said axis; actuating means for actuating said drive means; and gas duct means in communication with said chamber for permitting selective inflow of gas into said chamber and outflow of gas from said chamber; wherein said drive means comprises at least one sun and planet roller extrusion assembly mounted in said housing in at least one of said opposed end regions and said operative connection between said drive means and each said conveying shaft comprises a form lock between each said shaft and respective ones of said planet rollers of said roller assembly whereby actuation of said drive means by said actuating means causes each said conveying shaft to rotate about its said axis with all said shafts being caused to rotate in the same direction as one another, said actuation further causing each said conveying shaft to scrape against said internal wall of said housing thereby causing thin layers of said fluid material to be formed on said outer periphery of said chamber.

By providing at least one sun and planet roller extrusion assembly, any desired number of conveying shafts may be provided within the housing. Sun and planet roller systems are, of course, known per se and one such system is disclosed in German Offenlegungschrift No. 29 05 717. The conveying shafts are set in rotational motion about their own axes at a uniform circumferential speed whilst at the same time circulating around the longitudinal axis of the housing. During such circulation, the shafts scrape or brush against the internal wall of the housing.

A highly complex system is generally required to seal the conveying shafts from a vacuum in known arrangements, even though the shafts in such arrangements merely rotate about their own axes. A considerable amount of both structural and material outlay is required to provide such systems as is clearly evidenced by the sealing system disclosed in European Patent Specification No. 0 208 139A1.

The provision of at least one sun and planet roller extrusion assembly as is the case in the present invention solves all of the above-mentioned disadvantages in a very simple and economic manner. This is because only one shaft projects from the chamber defined within the housing, this being the shaft forming part of the actuating means which sets the sun and planet roller assembly rotating. Accordingly, the point of exit of this shaft from the housing is the sole point which requires the provision of a seal.

Moreover, in a reactor according to the present invention, the need for a complex transmission unit to produce the rotation of the conveyor shafts is eliminated, without the operation of the thin-layer reactor being adversely affected in any way. In a very simple manner, the present invention ensures that all of the conveying shafts of the reactor are rotated about their own axes in absolute synchronism and uniformly. This is a consequence of the force-locking connection between the conveyor shafts and the set of planet rollers in at least one sun and planet roller extrusion assembly.

In addition to their rotation about their own axes, the conveying shafts are also caused to travel around a circular path around the axis of the housing. In a preferred embodiment of the invention, each said sun and planet roller extrusion assembly comprises central spindle means said spindle means including an outer surface and teeth means formed on said outer surface, and a plurality of planet spindle means disposed around said central spindle at uniform inter-center spacings from one another, each said planet spindle including an outer surface and teeth means formed on said outer surface; and inwardly directed teeth means formed on said internal wall of said housing whereby said teeth means formed on said outer surface of said planet spindle means mesh with both said teeth means formed on said central spindle means and with said teeth means formed on said internal wall.

The engagement of the teeth on the planet rollers with the teeth on the central spindle of the or each sun and planet roller assembly and also with the teeth provided on the internal wall of the housing ensures such travel. The internal wall of the housing is also cleaned because of the circular path of the planet rollers around the internal wall of the housing. In consequence, it is not necessary for the housing to be rotated, as is the case in the apparatus disclosed in German Patent Specification No. 35 13 536. Accordingly, a thin-layer reactor in accordance with the present invention can be manufactured in a substantially more economic manner than has hitherto been possible.

Furthermore, the fluid material, while passing through the planet rollers of the sun and planet roller extrusion assemblies undergoes additional homogenization. This is due to a combination of the rolling action between the teeth on the planet rollers and the teeth on the internal wall of the housing, on the one hand, and between the teeth on the planet rollers and the teeth on the central spindle, on the other hand. The axial length of each of the planet roller extrusion portions to be used is selected in dependence upon the viscosity of the material being treated. If a chemical reaction takes place in the reactor, the axial length is selected in dependence upon the properties of the product being produced.

If desired, the planet rollers may be provided only to effect a transmission function, without being required to produce any homogenizing effect. In such a case, the axial length of the planet rollers can be kept very short.

In a preferred embodiment of the present invention, sun and planet roller extrusion assemblies are provided in both said opposed end regions of said housing and each assembly includes a central spindle, the reactor further comprising shaft means connecting said central spindles, said shaft extending longitudinally through said chamber and surrounding said central longitudinal axis of said housing, said central spindles and said longitudinally extending shaft jointly defining an internal bore surrounding said longitudinal axis of said housing, said reactor further including flange means communicating with said bore, and means for supplying gas to said bore and means for removing gas from said bore, selectively communicable with said flange means, said shaft additionally defining bore means extending transversely to said longitudinal axis, said transversely extending bore means communicating laterally with said chamber, and wherein said actuating means are disposed on one of said central spindles.

In such an arrangement, it is desirable that said central spindles of both said sun and planet roller extrusion assemblies and said shaft connecting said central spindle are formed integrally with one another.

The connection between the central spindles of the upper and lower sun and planet roller assemblies by means of a shaft having a reduced diameter compared with that of the central spindles is advantageous because the volume of the chamber formed between these two spindle portions and bounded by the conveying shafts is increased. The central spindle of the upper and lower planet roller extrusion portions and the shaft may be produced in one piece, so that both sets of planet rollers rotate absolutely synchronously with the conveyor shafts disposed therebetween. The drive means for effecting the rotational and circulatory movements of the conveyor shafts communicates with a shaft, which is connected to an upper centrally disposed spindle.

With very large sized reactors, however, it may be advantageous, for example, to screw-connect both the upper and lower central spindle portions to a shaft.

Further preferably, each said conveying shaft means has two axially opposed end regions at least one of which defines a longitudinally extending threaded internal bore, and said planet rollers in said assembly at said at least one end each carry bolt means extending axially therefrom, said bolts engaging each said threaded internal bore to produce said form-locking connection.

A bore is provided centrally in an upper central spindle portion, which bore communicates with the bore formed in the shaft connecting the two central spindle portions of the sun and planet roller assemblies and selectively with either a vacuum source if the material is to be degassed or with a gas source if gas is to be introduced into the material.

In a simpler embodiment, which can be manufactured more economically, the conveying shafts of the reactor are merely guided and are driven unilaterally by the planet rollers of a sun and planet roller extrusion assembly. In this embodiment, the free ends of the conveyor shafts are located in and guided by an annular recess formed in a connecting flange. In this embodiment, the conveyor shafts are mounted to rotate around a central, conically formed displacement member.

BRIEF DESCRIPTION OF THE DRAWINGS

Two embodiments of a multi-shaft thin-layer reactor in accordance with the present invention will be further described, by way of example, with reference to the accompanying drawings, in which:

FIG. 4 is a cross-sectional view taken along the line IV—IV of FIG. 1.

DESCRIPTION OF PREFERRED EMBODIMENTS

Figure 1:
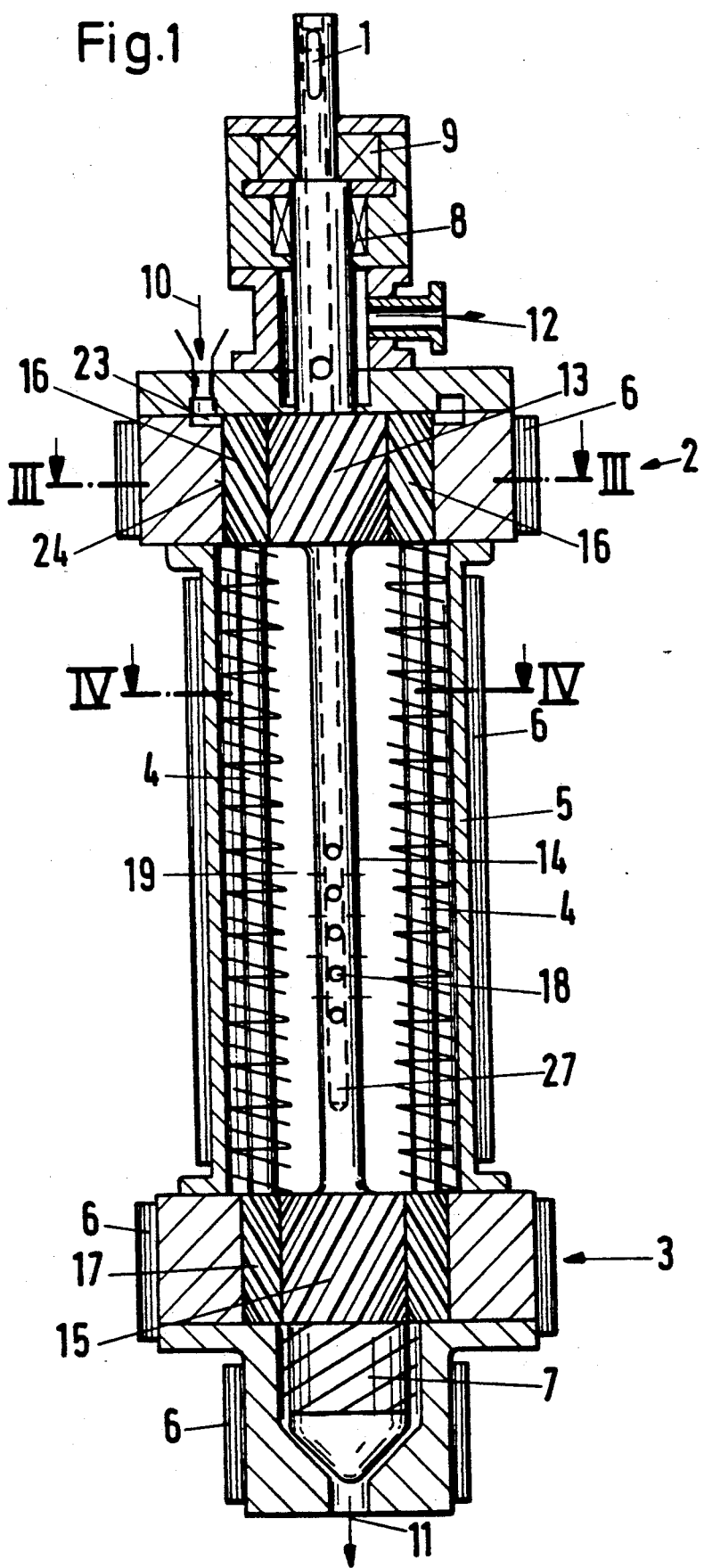
FIG. 1 is a longitudinal sectional view through a first embodiment of a thin-layer reactor in accordance with the present invention.

In FIG. 1, there is shown a thin-layer reactor which comprises a reactor housing 5. Centrally disposed within the housing 5 is a longitudinally extending drive shaft 1. In the upper and lower end regions of the housing, upper and lower sun-and-planet roller extrusion assemblies 2 and 3 respectively are disposed on the drive shaft The upper roller assembly 2 comprises a central spindle 13 which is provided, on its external periphery, with teeth which are inclined with respect to the longitudinal axis of the spindle and with respect to a plurality of toothed planet rollers disposed on spindles 16. The lower roller assembly 3 is similar to the upper roller assembly 2 and comprises a central spindle 15 and planet rollers disposed on spindles 17. The two central spindles 13 and 15 are interconnected by means of a central shaft 14. An adjustment spring (not shown) is provided for adjusting the location of the roller assembly 2.

The planet rollers mounted on the spindles 16 and 17 respectively mesh with one another and are disposed adjacent the internal periphery of the housing 5. A plurality of conveying shafts 4, also disposed within the reactor housing 5, are each screw-connected to a separate bolt (not shown), the bolts being shaped to fit onto each of the planet spindles 16 and 17. The bolts are screw threaded. The conveying shafts 4 extend substantially parallel to the axis of the housing 5. The upper and lower sun and planet roller extrusion assemblies 2 and 3 and the conveying shafts 4 are therefore all disposed in the housing 5. Heating elements 6 are provided around the external periphery of the housing 5, in order to permit the temperature of the molten material being treated within the housing to be modified. The conveying shafts 4 are provided with discs or flights which are so arranged that, when the shafts 4 rotate, the discs or flights provided on adjacent shafts 4 brush past one another. Effectively, therefore, a degassing chamber 19 is defined within the housing 5 radially inwardly of the shafts 4.

A discharge screw portion 7, which is itself provided with conveyor flights, is mounted on the lower central spindle 15. This causes a build-up of a tool pressure which ensures that the degassing chamber 19 is sealed in a downward direction, in a vacuum-tight manner.

The drive shaft 1 is mounted in an axial bearing 9 and sealed upwardly by means of a shaft seal 8.

The molten material to be treated is fed into the reactor, under pressure, through a feed aperture 10 formed in a shoulder portion of the housing 5. An annular conduit 23 is disposed beneath the feed aperture 10 and is disposed substantially centrally above the line of separation between the upper planet rollers mounted on the spindles 16 and the internal wall 24 of the housing in the region of the upper sun and of the planet roller extrusion assembly 2. This is advantageous because it provides substantially uniform distribution of the molten mass which has been introduced around the internal wall 24. Furthermore, the distribution of the molten mass can be further improved by providing a plurality of feed apertures 10, which would all be disposed above the annular conduit 23. By feeding the material under pressure into the reactor, the degassing chamber 19 is, effectively, sealed at its upper end.

The shaft 1 is provided with a central axial bore 27. The bore 27 communicates with means (not shown) for producing a vacuum. Such communication is achieved by the use of a connecting flange 12. Transversely extending bores 18 are also provided in the shaft 1, which bores 18 communicate with the axial longitudinal bore 27. This permits the production of a vacuum in the degassing chamber 19.

Figure 2:
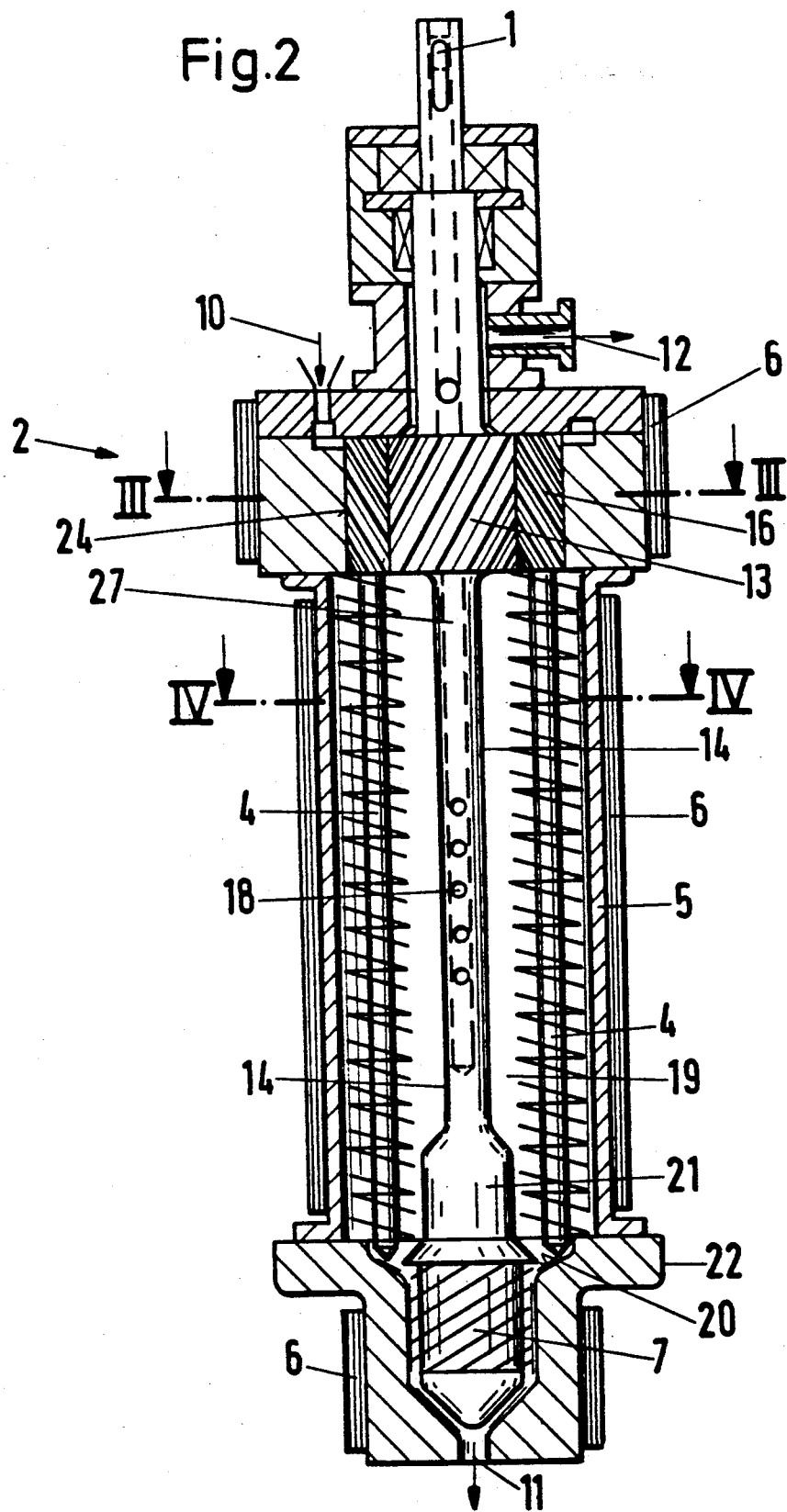
FIG. 2 is a longitudinal sectional view, similar to that shown in FIG. 1, of a second embodiment of a thin-layer reactor in accordance with the present invention.

The embodiment shown in FIG. 2 differs from that shown in FIG. 1 in that conveying shafts 4 are connected only at their upper ends to the planet roller spindles 16. At their lower ends, they extend freely into an annular recess 20, which is formed in a connecting flange 22 connected to the lower end of the housing 5. A substantially conical displacement member 21 is screwed into the lower end of the shaft 14.

The mode of operation of such a thin-layer reactor will now be described.

A molten mass of, for example, polyethylene to be degassed is fed through the feed aperture or apertures 10 into the annular conduit 23. It then passes through the gaps 25 formed between the internal wall 24 of the housing and the planet rollers mounted on the spindles and through the gaps 26 formed between the planet roller and the central spindle 13. Degassing chamber 19 is, as aforementioned, sealed at its upper end by the molten mass being introduced under pressure.

The inclined toothed planet rollers mounted on the spindles 16 are caused to travel along the internal wall 24, which is also toothed, of the housing by setting the inclined toothed central spindle 13 in rotational motion. As can be seen in FIG. 4, planet spindles 16 simultaneously rotate about their own axes, as shown by the arrows 29 and simultaneously execute a circulatory movement, as shown by the arrows 30, around the central spindle 13.

Figure 3:
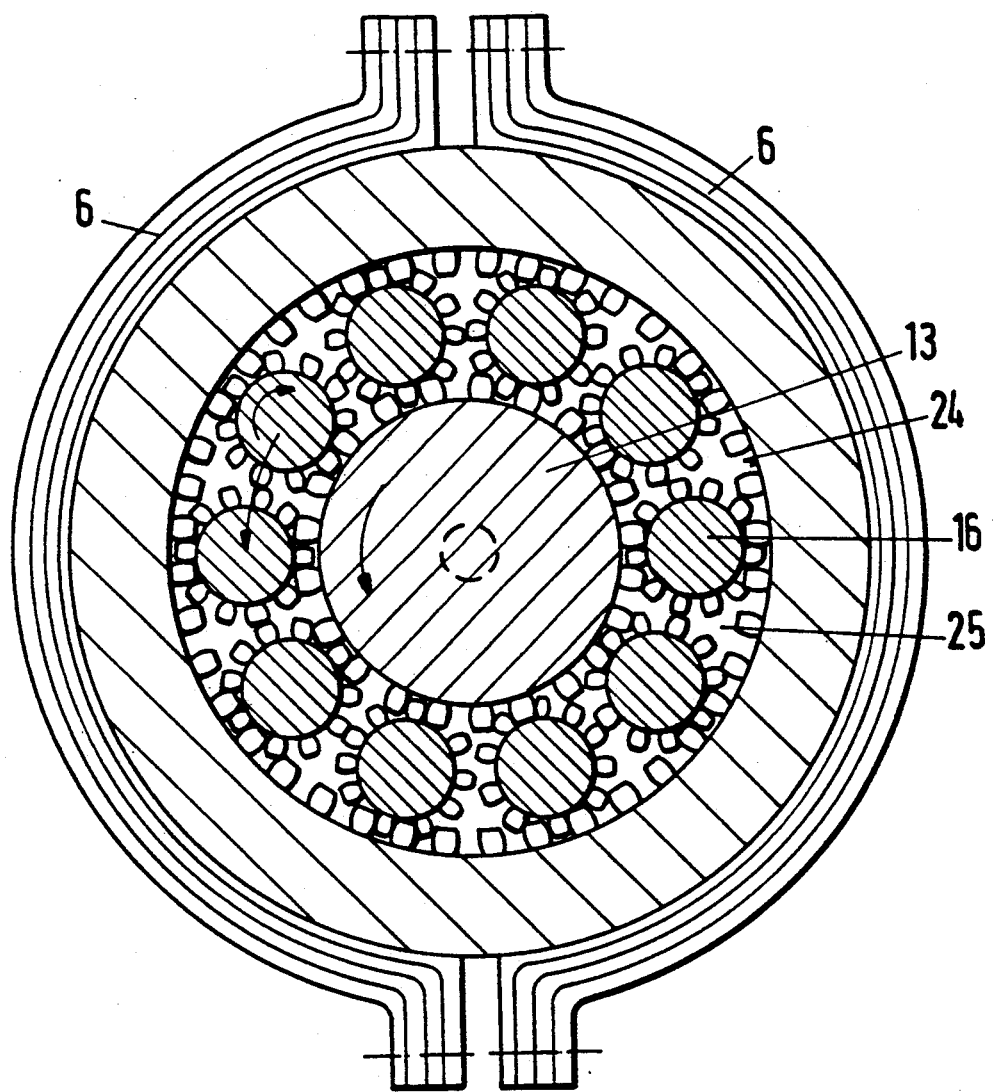
FIG. 3 is a cross-sectional view taken along the line III—III of FIG. 1.

The molten material passes through the annular conduit 23 into the cavities 25 shown in FIG. 3 and is thus conveyed downwardly onto the external surface of the conveying shafts 4 into the cavities 26, shown in FIG. 4 formed between the discs or flights on the shafts 4 and the internal wall of the housing 5.

A certain amount of molten material is entrained by the rotating conveying shafts 4 into the degassing chamber 19 and thin layers of molten mass are formed on the shafts 4. The thickness of the layers of molten mass deposited on the peripheral portions of the conveyor shafts 4, which effectively form the radially outer periphery of the degassing chamber 19, is determined by the spacing between the kneading discs or other elements or the flights of the conveying shafts 4. In consequence, it is always possible to adapt the thin-layer reactor of the invention to differing material viscosities simply by interchanging the conveying shafts 4 in use by shafts having a different geometry of flights, or kneading discs which may have larger or smaller spacings from one another.

As is well-known, it is very difficult to remove volatile ingredients from a high-molecular weight, highly viscous molten mass. A rapid and economic degassing is only possible if extremely thin layers of material can be provided over a large surface area. In the present application, the large surface area is achieved because of the surface area of the discs or flights forming the periphery of the degassing chamber 19 is very large.

The conveying effect is adjustable by suitably selecting the geometry of the conveying shafts 4. The molten material is conveyed downwardly by the shafts 4 and enters the lower sun and planet roller assembly 3.

A high vacuum is produced in the degassing chamber 19 by means of a vacuum pump (not shown), which is connected to the degassing flange 12. The bore 27 and the apertures 18 in the shaft 14 cause the vacuum thus produced to prevail in the chamber 19.

The sealing effect at the lower end of the chamber 19 is achieved by means of the presence of the molten material in the discharge screw 7. The molten mass is discharged through the discharge opening 11 under pressure for any desired further treatment. It may, for example, be supplied to a water-ring granulator.

The thin-layer reactor is preferably utilized for polymerization, addition polymerization and the condensation polymerization of plastics materials. In such reactions, any volatile components in the molten material generally must be removed. However, the thin-layer reactor of the present invention can obviously also be operated in a manner opposite to that described hereinbefore. Hence it is often expedient to blend a gas with fluid or liquid substances in order to carry out some chemical reactions. To achieve this, the gaseous substance is then passed into the degassing chamber 19 through the flange 12 instead of a vacuum being produced. Rotation of the conveying shafts 4 produces thin layers of the liquid or fluid which readily entrains the gaseous substance.

I claim:

1. A multi-shaft thin-layer reactor for the treatment of fluid materials wherein gaseous components are present during said treatment, said reactor comprising:
    a) housing means having a longitudinal axis and a wall surface spaced from said longitudinal axis to form an internal wall of said housing thereby defining a hollow interior within said housing, and first and second opposed axial end regions;
    b) feed means for introducing said fluid material into said hollow interior of said housing;
    c) a plurality of conveying shaft means disposed adjacent and in intermeshing relation with one another within said hollow interior adjacent said internal wall of said housing; each of said conveying shaft means including a longitudinal axis, with said axes of said shaft means all extending parallel with one another and jointly defining the outer periphery of a chamber within said hollow interior of said housing;
    d) drive means operatively connected to each said conveying shaft means for rotation of each said shaft means about its axis, said driven means comprising at least one sun and planet roller extrusion assembly mounted in said housing in at least one of said opposed end regions, said planet roller extrusion assembly including a plurality of planet rollers, and said operative connection between said drive means and each said conveying shaft means comprising a form lock between each said shaft and respective ones of said planet rollers of said roller extrusion assembly;
    e) actuating means for actuating said drive means, said actuation causing all of said conveying shaft means to rotate about their axis in the same direction, each said conveying shaft means functioning to scrape against said internal wall of said housing thereby causing thin layers of said fluid material to be formed on said outer periphery of said chamber, and
    f) gas duct means in communication with said chamber for selectively permitting inflow of gas into said chamber or outflow of gas from said chamber so as to vary the gaseous condition therein.

2. A reactor as recited in claim 1, further including a source of reduced pressure communicating with said gas duct means to remove gaseous material from said chamber.

3. A reactor as recited in claim 1, further including gas supply means communicating with said gas duct means, said supply means supplying gas to said chamber at a pressure in excess of the pressure subsisting in said chamber.

4. A multi-shaft thin-layer reactor as recited in claim 1, wherein each said sun and planet roller extrusion assembly comprises central spindle means including an outer surface and tooth means formed on said outer surface, and a plurality of planet spindle means disposed around said central spindle means at uniform inter-center spacings from one another, each said planet spindle means including an outer surface and tooth means formed on said outer surface; said internal wall of said housing being formed with inwardly directed tooth means, the teeth of said planet spindle means meshing both with said tooth means formed on said central spindle means and with said tooth means formed on said internal wall of said housing.

5. A multi-shaft thin-layer reactor as recited in claim 1, wherein sun and planet roller extrusion assemblies are provided in both said opposed end regions of said housing, each extrusion assembly including a central spindle, said reactor further comprising central shaft means connecting said central spindles, said central spindles and said longitudinally extending central shaft jointly defining an internal bore surrounding said longitudinal axis of said housing, said central shaft means further defining bore means extending transversely to said longitudinal axis, said transversely extending bore means communicating laterally with said chamber, and wherein said actuating means are disposed on one of said central spindles.

6. A multi-shaft thin-layer reactor as recited in claim 5, wherein said central spindles on both said sun and planet roller extrusion assemblies and said central shaft means are formed integrally with one another.

7. A multi-shaft thin-layer reactor as recited in claim 5, wherein said central spindles are mounted on said central shaft means.

8. A multi-shaft thin-layer reactor as recited in claim 3, wherein each said conveying shaft means has two axially opposed end regions, and wherein at least one of said end regions defines a longitudinally extending threaded internal bore, and wherein said planet rollers in said extrusion assembly at said at least one end of said housing each carry bolt means extending axially therefrom, said bolt means engaging in said threaded internal bore to produced said form locks between said planet rollers and each of said conveying shaft means.

9. A multi-shaft thin-layer reactor as recited in claim 5, additionally comprising continuous polygonal mandrel means, said mandrel means including opposed axial end regions, and wherein said sun and planet roller extrusion assemblies are provided in both said opposed end regions of said housing, the planet rollers of one said assembly and individual conveying shaft means being mounted on one of said opposed axial end regions of said mandrel, and the planet rollers of the other said extrusion assembly are mounted on said other axial end region of said mandrel.

10. A multi-shaft thin-layer reactor as recited in claim 1, wherein said feed means comprises at least one feed aperture for said fluid material and annular conduit means communicating with said feed aperture and with said hollow interior of said housing in the region of said internal wall of said housing.

11. A multi-shaft thin-layer reactor as recited in claim 10, additionally comprising a screw extruder discharge means force-locked to said central spindle of said sun and planet roller assembly provided in said second end region of said housing, said discharge means comprising a barrel and screw means rotatable within said barrel, said screw means comprising a core and helical flight means disposed around said core, whereby material entering said discharge means from said chamber effectively seals said chamber.

12. A multi-shaft thin-layer reactor as recited in claim 5, additionally comprising a screw extruder discharge means force-locked to said longitudinally extending shaft and communicating with said chamber whereby material entering said discharge means from said chamber effectively seals said chamber.

* * * * *